(12) United States Patent
Szymkowiak (10) Patent No.: US 10,282,428 B2
(45) Date of Patent: May 7, 2019

(54) COMPUTER INSTALLATION FOR THE MANAGEMENT OF A SET OF FILES, METHOD, PROGRAM AND COMPUTER MEDIUM ASSOCIATED THEREWITH

(75) Inventor: Bertrand Jean Szymkowiak, Lyons (FR)

(73) Assignee: ESPERAR, Vaulix-Milieu (FR)

( * ) Notice: Subject to any disclaimer, the term of this patent is extended or adjusted under 35 U.S.C. 154(b) by 586 days.

(21) Appl. No.: 14/425,918

(22) PCT Filed: Sep. 5, 2012

(86) PCT No.: PCT/IB2012/002040
§ 371 (c)(1),
(2), (4) Date: Sep. 21, 2015

(87) PCT Pub. No.: WO2014/037759
PCT Pub. Date: Mar. 13, 2014

(65) Prior Publication Data
US 2016/0004714 A1    Jan. 7, 2016

(51) Int. Cl.
| | |
|---|---|
| G06F 3/048 | (2013.01) |
| G06F 17/30 | (2006.01) |
| G06F 3/0481 | (2013.01) |
| G06F 3/0482 | (2013.01) |
| H04L 29/08 | (2006.01) |

(52) U.S. Cl.
CPC ...... *G06F 17/30126* (2013.01); *G06F 3/0482* (2013.01); *G06F 3/04817* (2013.01); *G06F 17/30067* (2013.01); *G06F 17/30091* (2013.01); *G06F 17/30174* (2013.01); *G06F 17/30203* (2013.01); *G06F 17/30327* (2013.01); *G06F 17/30994* (2013.01); *H04L 67/06* (2013.01)

(58) Field of Classification Search
CPC ........ G06Q 10/00; G06Q 10/06; G06Q 10/10; G06Q 30/02; G06Q 50/01
See application file for complete search history.

(56) References Cited

U.S. PATENT DOCUMENTS

| | | | |
|---|---|---|---|
| 2002/0019827 A1* | 2/2002 | Shiman | ............ G06F 17/30011 |
| 2002/0107859 A1 | 8/2002 | Tsuyuki | |
| 2008/0091745 A1* | 4/2008 | Malik | ............... G06F 17/30073 |

(Continued)

FOREIGN PATENT DOCUMENTS

WO    WO 2006034218    3/2006

OTHER PUBLICATIONS

International Search Report in PCT Application PCT/IB2012/002040, EPO, dated Jun. 6, 2013.

*Primary Examiner* — Claudia Dragoescu (57) ABSTRACT

The invention relates to a computer installation for the management of a set of files, comprising a network including a server and a workstation, said installation further comprising a graphical user interface that is adapted to: —display a virtual space (1) as well as a first icon that represents one of said files (A) of the set of files, said first icon being placed within said virtual space (1), —enable a user of said workstation to control, by interaction of the control peripheral with said first icon, the display of a first interactive tool enabling said user to record on said server the existence of a link between said first file and at least another one of said files of the set of files. Computer installation for the management of a set of files.

18 Claims, 5 Drawing Sheets

(56) References Cited

U.S. PATENT DOCUMENTS

| | | | |
|---|---|---|---|
| 2012/0124677 A1* | 5/2012 | Hoogerwerf | G06F 3/04883 726/29 |
| 2012/0233529 A1* | 9/2012 | Bascom | G06F 17/30882 715/205 |

* cited by examiner

COMPUTER INSTALLATION FOR THE MANAGEMENT OF A SET OF FILES, METHOD, PROGRAM AND COMPUTER MEDIUM ASSOCIATED THEREWITH

TECHNICAL FIELD

The present invention relates to the general technical field of file management computer installations, enabling for example a plurality of users located remote from each other to access computer files, to modify said files and to record them, in particular by means of workstations networked with one or several servers.

The present invention more particularly relates to a computer installation for the management of a set of files comprising a network including at least, on the one hand, a server, and on the other hand, a workstation that is provided with a display peripheral and a control peripheral, each of said files being recorded on said server and/or on said workstation.

The invention also relates to a method for managing a set of files, each of said files being recorded on a server and/or on a workstation provided with a display peripheral and a control peripheral, said servers and workstations being part of a network.

The invention further relates to a computer program comprising a computer program code means adapted to execute the steps of a method according to what precedes.

Finally, the invention relates to a computer-readable medium on which is recorded a computer program according to what precedes.

PRIOR ART

The great majority, if not the quasi-totality, of the economic activities in practice in the industrial societies involves the more or less large-scale use of computer tools making it possible to generate, modify and record digital documents of any nature.

Therefore, for many companies, a great part of the know-how is contained in the collection of computer documents generated over time and according to the projects carried out by the personnel of the company in question.

The mass of information concerned may however be considerable, so that it becomes difficult, if not impossible, to access relevant information, at the right time, with conventional computer means, which are generally based on a directory-tree-hierarchy file classification, wherein each directory contains either one or several directories (forming subdirectories) or one or several files.

This drawback may lead to damaging situations for the company, for example when the latter works on a new project that turns out to be very similar to an older project, so that all or part of the documents generated for the older project could be very useful for the new project.

With the existing computer tools, it may however be difficult, or even impossible, to identify a possible relation of proximity (of any nature: geographical proximity, proximity of persons, or intellectual proximity: proximity of issues to be solved, of tools used, etc.) between the projects in question and thus the relevance to refer to the older project documents.

Further, even if this relation of proximity between the older and the new project was established (thanks for example to a staff member that manage to establish the link between the two projects), the conventional computer tools generally made available to everybody in a company would not necessarily make it possible to find exhaustively, within an acceptable time, the documents relating to the older project, even if these documents have not been deleted and are actually recorded on a computer medium.

This, of course, affects the productivity of the company, which does not take fully advantage of its capital of experience. This of course results in economic loss for the company.

Other situations also exist, in which the known computer file management systems show their limitations. For example, a company staff member may have to urgently handle a case (of any nature: legal, technical, commercial, or other) that was up to now handled by another staff member having left the company more or less rapidly, for any reason (illness, retirement, resignation, etc.). Insofar as the staff member newly seized with the case was up to now absolutely not involved therein, an adequate and efficient handling of said case generally requires examination of a number of documents generated along with the case progress (for example: quotation, specifications, e-mails, technical notes, various reports, legal consultations, calculation notes, etc.). The identification of all the relevant computer files by the staff member newly in charge of the case may in practice prove extremely difficult, tedious and risky, even as taking into account all the relevant documents may be of capital importance for obtaining the wanted result.

Another example of situation in which the known file management computer systems show their limits is when a company staff member tries to rapidly and reliably identify all the documents having served as a basis for the elaboration of a final summary document.

Such a search may also prove difficult because it may involve scanning a gigantic directory tree.

The objects assigned to the invention are consequently to remedy the various drawbacks specified above and to propose a new computer installation for the management of a set of files that, while being of extremely simple, robust and ergonomic design, enables a user to simply and intuitively organize files so as to make the access to the information contained in these files particularly easy, fast and reliable.

Another object of the invention is to propose a new computer installation for the management of a set of files that is extremely easy to comprehend, without requiring any particular skill or material.

Another object of the invention is to propose a new computer installation for the management of a set of files that makes it possible to organize files in an extremely legible and comprehensible manner, in order to facilitate the access to the files in question.

Another object of the invention is to propose a new computer installation for the management of a set of files that is compliant with the directory-tree-based operating systems usually installed on computers and that does not substantially modify the working environment of the users whose workstations are equipped with such directory-tree-based operating systems.

Another object of the invention is to propose a new computer installation for the management of a set of files whose operation is very intuitive and low power consuming.

Another object of the invention is to propose a new computer installation for the management of a set of files whose design makes it possible to easily check the file access rights granted to the users.

Another object of the invention is to propose a new computer installation for the management of a set of files enabling the users thereof to easily work collaboratively on a same file, while having permanently the last updated version of the file concerned.

Another object of the invention is to propose a new computer installation for the management of a set of files allowing access to a same file by various access paths, different from each other.

Another object of the invention is to propose a new computer installation for the management of a set of files making it possible to easily and rapidly find files that are nevertheless not stored at the same place within a directory tree.

Another object of the invention is to propose a new computer installation for the management of a set of files making it possible to identify by one quick look a group of relevant documents for a given situation, as well as the possible existence of relations between some of the documents of the group of files in question.

Another object of the invention is to propose a new method for managing a set of files enabling a user to simply and intuitively organize files so as to make the access to the information contained in these files particularly easy, fast and reliable.

Another object of the invention is to propose a new computer program and a new computer-readable medium on which is stored a computer program, which enables the various above-mentioned advantages to be obtained.

DISCLOSURE OF THE INVENTION

The objects assigned to the invention are achieved by means of a computer installation for the management of a set of files comprising a network including at least, on the one hand, a server, and on the other hand, a workstation that is provided with a display peripheral and a control peripheral, each of said files being recorded on said server and/or on said workstation, said installation further comprising a graphical user interface adapted to:
  display on said display peripheral at least one virtual space as well as a first icon that represents one of said files of the set of files, called the first file, said first icon being placed within said virtual space,
  enable a user of said workstation to control, by interaction of the control peripheral with said first icon and without of said first file being open, the display on said display peripheral of a first interactive tool enabling said user to record on said server the existence of a link between said first file and at least another one of said files of the set of files, called the second file, said recording of the existence of said link being adapted to last independently of the subsequent location of said first icon within said virtual space.

The objects assigned to the invention are also achieved by means of a method for managing a set of files, each of said files being recorded on a server and/or a workstation provided with a display peripheral and a control peripheral, said server and workstation being part of a network, said method comprising at least the following steps:
  a graphical user interface displays, on said display peripheral, at least one virtual space as well as a first icon that represents one of said files of the set of files, called the first file, said first icon being placed within said virtual space,
  a user of said workstation controls, by interaction of the control peripheral with said first icon and without said first file being open, the display on said display peripheral of a first interactive tool, said user records on said server, by means of said first interactive tool, the existence of a link between said first file and at least another one of said files of the set of files, called the second file, said recording of the existence of said link being adapted to last independently of the subsequent location of said first icon within said virtual space.

The objects assigned to the invention are also achieved by means of a computer program comprising a computer program code means adapted to execute the steps of the above-mentioned method.

The objects assigned to the invention are also achieved by means of a computer-readable medium on which is recorded a program according to what precedes.

BRIEF DESCRIPTION OF THE DRAWINGS

Other objects and advantages of the invention will appear more fully from the following description, with reference to the appended drawings, given only by way of illustration and not as a limitative example, and in which.

BEST WAY TO IMPLEMENT THE INVENTION

According to a first aspect, the invention relates to a computer installation for the management of a set of files.

The files in question are computer files, i.e. they are each consisted by a group of digital data forming a unit identified by a name and capable of being recorded and stored on a computer medium, such as a hard disk or other. Within the framework of the invention, the files of the set of files may be of any type and any format.

The installation of the invention comprises a network including at least, on the one hand, a server, and on the other hand, a workstation. As used herein, the term "network" has to be considered in its conventional computer-science meaning, denoting a set of communication elements (cable, wireless system, etc.) making it possible to establish a computer-based communication between at least the server and the above-mentioned workstation.

Preferably, the network in question is itself linked to the Internet, or even directly formed by the Internet itself. The server and the workstation are hence networked and can thus communicate with each other, preferably in a two-directional manner, so that they can exchange digital data (including files) with each other. Hereinafter, for simplicity and concision of description, it will be essentially referred to an installation comprising one server and one workstation. However, it is perfectly conceivable, and this besides constitutes the most interesting embodiment of the invention, that the invention comprises a plurality of workstations networked with the server. Likewise, it is perfectly conceivable that the network comprises not only one unique server but several servers. Of course, the number and the geographic location of the servers and workstations will be adapted to the needs of the entity (company, administration, etc.) liable to use the computer installation.

The server is for example consisted by a computer that includes in particular and conventionally a storage medium, which is for example consisted of one or several hard disks. As used herein, the term "server" has to be considered in its most general meaning, i.e. denoting any computer system, of any nature (hardware, software), capable of offering to workstations (user stations) a given service (for example, as in the present case, a computer data storage service). Therefore, within the framework of the invention, the server may possibly be consisted by a simple data storage area. The workstation is formed by any stand-alone computer equipment, such as a computer (desktop or laptop, for example), a graphic tablet, a smartphone or a personal digital assistant (PDA), the list being of course not limitative. It conventionally includes a central processing unit comprising for example itself at least one processor and memories (RAM, ROM, etc.). The workstation is provided with a display peripheral, advantageously formed by a display screen that is for example functionally connected to the central processing unit. The screen in question may be, for example, according to the workstation nature, an individual computer monitor, a graphic tablet touch screen, a phone screen, or even a television screen. The display peripheral may thus be either an output peripheral, which provides only a display function (the case of a conventional computer monitor or a television screen), or an input-output peripheral (in the case where the screen in question is a touch screen implemented, for example, on a graphic tablet, a PDA or a smartphone). The workstation also comprises at least one control peripheral enabling the user to drive, at least partially, the workstation.

The control peripheral may comprise any known input peripheral, such as a keyboard, a mouse, a roller or other, as well as any input-output peripheral (of the touch-screen type, as mentioned above).

Each of said files of the above-mentioned set of files is recorded on said server and/or on said workstation. Preferably, some of the files of the set of files are recorded on the server, whereas other files of said set of files are recorded on said workstation. As used herein, "recorded on" refers to the fact that the concerned files are stored in the permanent memory of the server and/or of the workstation, as well known as such.

The installation of the invention has thus a conventional and common "client-server" architecture, which constitutes an advantage of the invention, which way be easily adapted to the environments commonly met in practice.

Preferably, the workstation is equipped with an operating system, and preferably an operating system implementing a directory tree hierarchy. Such an operating system is well known as such and enables the classification of files according to a directory and subdirectory tree hierarchy. Preferably, the operating system in question lies on a window-based interface, wherein said windows are displayed on the display peripheral and symbolize a given directory. Such a directory-tree-hierarchy and window-based operating system is well known as such and hence does not require to be described in more details herein. By way of example, the operating system equipping the workstation may be chosen in the following list, given only by way of illustration and not as a limitation: MS Windows®, Unix®, Linux® and Mac OS®. Therefore, the invention does not require the implementation of a specific operating system on the workstation(s) of the installation, so that the user of a given workstation can keep his/her usual working environment.

The installation of the invention further comprises a graphical user interface enabling one or several users, and in particular the user of the above-mentioned workstation, to interact with said installation.

As used herein, "graphical user interface" denotes generally a means of dialog between at least one user and at least one computer device (such as a computer or equivalent: tablet, smartphone, PDA, etc.) provided with a display peripheral, said dialog means being based on the use of graphical objects, displayed on said display peripheral and enabling the concerned user to interact with said computer device (to use software applications or to organize the storage of files, for example).

The graphical user interface of the installation of the invention is adapted to display, on said display peripheral of said workstation, at least one virtual space 1 as well as a first icon 2 that represents one of said files of the set of files, called hereinafter the first file A, said first icon 2 being placed within said virtual space 1. The virtual space 1 is for example two-dimensional and is, in this case, advantageously in the form of a plane surface extending in two directions X, Y of the space, so as to be included in a single one plane, which is advantageously the display plane of the display peripheral.

In other words, the virtual space 1 is advantageously formed by the two-dimensional space delimited by the display peripheral itself. The virtual space 1 may of course have a changing character, as a function for example of the possible windows or applications open on the workstation. And the first icon 2 is a virtual object that visually embodies the corresponding file.

Advantageously, each file of said set of files is respectively represented by a corresponding icon, to which is preferably associated the file name, the latter being placed under the icon in question.

Preferably, the graphical user interface of the installation of the invention enables a user of the workstation to move, for example by pointing and drag-and-drop operations performed by means of a mouse belonging to the control peripheral, each of said icons representing one of said files, which notably enable to directly move the concerned file within the directory-tree-hierarchy file-management system preferably equipping said workstation. From that point of view, the graphical user interface operates in a completely conventional manner, i.e. similarly to the graphical user interface implemented by the known window-based operating systems.

According to the invention, said graphical user interface of the installation is also adapted to enable a user of the workstation to control, by interaction of the control peripheral with said first icon 2 and without said first file A being open, the display on said display peripheral of a first interactive tool 3 enabling said user to record on said server the existence of a link between said first file A and at least another one of said files of the set of files, called the second file B.

In other words, the graphical user interface of the installation of the invention enables a user of the workstation to act, through the control peripheral with which the workstation is equipped, on the first icon 2 representing the first file A, so as to launch the display of said first interactive tool 3, without having to access the content of said first file A. Of course, the interaction of the control peripheral with said first icon 2 that enables the display of the first interactive tool 3 may take different forms. According to a first example, the control peripheral comprises a pointing tool, as for example a mouse, provided with at least one, and preferably at least two, push-buttons. In this case, the interaction of the control peripheral with said first icon 2 that enables the display of the first interactive tool 3 may advantageously consist in positioning the mouse cursor on the first icon 2 and in pressing one of the mouse push-buttons (for example, the right button), to make the first interactive tool 3 appear on the screen forming the display peripheral. According to another possibility, the interaction in question may consist in moving the first icon 2 within said virtual space 1, said moving being for example obtained by a drag-and-drop operation performed by means of the above-mentioned mouse. Advantageously, the computer installation object of the invention cumulates various modes of controlling the display of the first interactive tool 3, so as to offer to the user various ways to obtain the display of the first interactive tool 3.

The first interactive tool 3, whose display on the display peripheral has been activated thanks to the interaction of the control peripheral with the first icon 2 caused by the user, enables the latter to create a link between the first file A and the second file B, and to record the existence of this link on the server in a lasting manner. Thanks to this functionality, a user may very easily and very rapidly record the fact that two files A, B are linked, whatever the nature of said link. The recording of the existence of said link on the server subsequently enables any user of the installation to access the information and therefore to be informed of the existence of said link. Such technical arrangement makes it possible to link documents between each other, independently of the way and the place where the corresponding files are classified and stored. For example, said first file A and second file B may perfectly be classified in remote directories, on remote machines. Such functionality thus makes it possible to establish, extremely intuitively and efficiently, a link between files, the existence as such of this link subsequently indicating to the users of the computer installation that a relation exists between the so-linked files. Further, the relevance of this relation is proved in that the existence of said link between the concerned files is controlled by the workstation user, through the control peripheral and through the interactive tool 3. This avoids the pitfalls that could result from the purely automatic creation of links, taken into account in particular the risk that a purely automatic system may underestimate the relevance of the relation between two files. One of the main assets of the invention thus lies in the possibility to enable a user to rapidly and easily report the existence of a link between two files, so as to make this information subsequently accessible to other users of the installation of the invention, it being understood that the creation and the recording of the links in question remain exclusively under the control of the users, the installation of the invention providing only an adapted interface without substituting for the judgment thereof as for the relevance of the link.

Advantageously, the installation includes an import directory that belongs to the directory tree hierarchy of the operating system equipping said workstation, said graphical user interface being adapted to enable a user of said workstation to control the display of the first interactive tool 3 by moving said first file A to said import directory.

In this case, the moving is performed by interaction of the control peripheral with the first icon 2, for example by a drag-and-drop operation as mentioned above. The transfer of the first file A to the import directory therefore causes the display of the first interactive tool 3, which is then available to the user to record the link between the first file A and the second file B. The display of the first interactive tool 3 may be performed directly, in response to the moving of the first file A to the import directory, or indirectly, in which case the user has to confirm that he/she effectively wants to display the first interactive tool 3 (for example, by clicking on an acceptance box of a window asking the user if he/she effectively wants to access said tool 3 in question). Preferably, the graphical user interface is adapted, on the one hand, to display on the display peripheral an import window 4 representing said import directory, and on the other hand, to enable the user to control said display of said first interactive tool 3 by moving, by means of the control peripheral, the first icon 2 to said import window 4. Particularly preferentially, the moving of the first icon 2 to the import window 4 is made in a conventional way, thanks to a drag-and-drop operation performed by means of a pointing tool belonging to the control peripheral, said pointing tool being advantageously consisted by a mouse.

The above-described variant, according to which the positioning of the first file A (or at least the first icon 2) in a specific directory integrated to the directory tree hierarchy of the operating system present on the workstation, enables the user to extremely simply access the new functionalities provided by the installation without changing drastically his/her usual working environment and, even, using a conventional element (directory) of the working environment in question. This constitutes a factor of ergonomics and simplicity of use of the installation. Of course, the above-described mode of controlling the display of the first interactive tool 3 does not exclude, quite the reverse, that other modes may also be available, so that the user can choose the manipulation he/she prefers (moving file A, right-clicking file A, etc.) as a function of his/her working context.

In order to enable a subsequent access to the information consisted by the existence of said link between the first and second files A, B, said recording of the existence of said link between the first and second files A, B is adapted to last independently of the subsequent location of said first icon 2 within said virtual space 1. In other words, the recording of the link performed on the server thanks to the first interactive tool 3 is permanent and does not disappear in case the first icon 2 and/or the corresponding first file A is moved. For example, once said link is recorded, the file A can be moved without making the recording of the existence of said link between the first file A and the second file B disappear. Preferably, the recording of the existence of said link can be deleted only by a positive action of a duly authorized user.

Advantageously, the installation is also adapted, on the one hand, to duplicate the files contained in said import directory on the server, and on the other hand, to perform the synchronization of said files. In other words, according to this preferential technical arrangement, the positioning of the files in the import directory not only enables the user to access the first interactive tool 3 as exposed hereinabove, but also causes, possibly upon previous validation by the user (by means of a clickable-button validation windows, for example), the copy of the files locally contained in the import directory (which is installed on the workstation) to the memory of the server. Once this copy is performed, the installation is advantageously adapted to perform a permanent two-directional synchronization between the server and the import directory installed on the workstation, so that:
  as soon as the modification is performed on the workstation, the so-modified file is duplicated to the server;
  any modification sent to the server (for example from another workstation) is passed on all the client workstations of the installation.
  Preferably, the synchronized data comprise:
  the file content,
  the file name,
  an indicator of access right (for example: read only or read/write)
  an indicator of the document version,
  keywords allocated to the document,
it being understood that the above-mentioned list is absolutely not limitative and is given only by way of example.

Advantageously, this preferably two-directional synchronization is implemented by means of an agent that is part of the installation and that is installed on all the workstations of the installation, i.e. all the user client-stations. This agent is a software application whose function is to monitor all the files synchronized with the server (i.e., in the preceding example, all the files included in the import directory, which can besides also be organized into subdirectories), which comes in practice to implement the following operations:
  detecting the file content and name modifications: such events cause the sending of modification information to the server.
  detecting the deletions: no sending to the server; the file is simply deleted from the local data of the agent.
  detecting the file creations (with possible opening of a window for defining metadata relating to the file in question).
  detecting the file moving operations within the file system: the document remains synchronized and no update is sent to the server.

Preferably, the installation is adapted to allocate to each synchronized file a unique technical identifier, forming metadata attached to the file in question, this unique technical identifier being known from both the server and the agent installed on each workstation. This unique technical identifier is advantageously generated at the time of duplication of the file on the server, i.e. at the first recording of the concerned file on the server.

By way of example, the case can be mentioned of two users both having a same file recorded on their respective workstations, said stations belonging to the network of the installation of the invention. According to this example, the first user has placed the file in question in a subdirectory of the import directory of his/her workstation. The second user has placed the file at the root of the import directory. The file has the same name on the workstation of the first user and on the workstation of the second user. All the modifications performed by the first user on the file as recorded on the workstation of the first user will be automatically updated on the same file recorded on the workstation of the second user, through the server. Of course, the reverse is true, so that any modification made by the second user on his/her local file will be automatically updated on the local file of the first user, through the server.

Advantageously, the computer installation of the invention is adapted so that the possibility to record the existence of the link between the first and second files A, B, necessarily involves the recording and/or the duplication of said first file A and second file B on the server.

Finally, in this advantageous embodiment, the import directory is a mode of introducing files in a specific file management system, managed by the server and making it possible, on the one hand, to record links between the files so-introduced in said system, and on the other hand, to synchronize the files present both on the server and on one or several workstation(s) connected to said server through the network.

Preferably, the graphical user interface of the computer installation of the invention is adapted to modify the visual aspect of the first icon 2 when said associated first file A is moved for the first time to the import directory. This aspect modification of the icon 2 enables the user to identify by one quick look that the concerned file A has been duplicated on the server and is subjected to the synchronization action ensured by the installation, preferably by means of the above-described agent. Of course, it is true for all the icons of all the files liable to be deposited in the import directory.

Advantageously, the visual aspect modification of the first icon 2, and generally of each icon representing a file deposited in the import directory, consists in superimposing on the file icon (for example on the first icon 2) a reduced-dimension sub-icon 2A, smaller than the icon 2, and placed for example in the left lower corner of the icon 2.

Advantageously, the aspect of this sub-icon 2A is also changing, so that it can, for example, present various aspects corresponding to the following situations:
  The file is an updated working document, i.e. it is duplicated on the server and the version recorded on the server is identical to that recorded in the import directory on the workstation.
  The document is versioned, i.e. it is no longer a simple working document and it has been allocated with an index corresponding to the specific version.
  The file is a working document waiting for being updated, i.e. the modifications performed locally on the file at the workstation have not yet been recorded on the server (the synchronization has not yet taken place).
  A conflict exists between the versions of a same file recorded, on the one hand, in the import directory on the workstation, and on the other hand, on the server. Such a conflict appears when a same document has been modified in parallel by two different users on their respective workstations. Advantageously, when a conflict is detected, the installation is adapted to rename the concerned file present in the import directory of each user, by attaching for example to the latter an extension indicating the existence of a conflict. Each user can then examine the modifications and decide, possibly after conferring with the other user concerned, which modifications will be kept and thus which file version will be recorded.

Advantageously, the first interactive tool 3 includes a first input area 5 enabling said user to input and record on the server information relating to the nature of the link between the first file A and the second file B.

Figure 1:
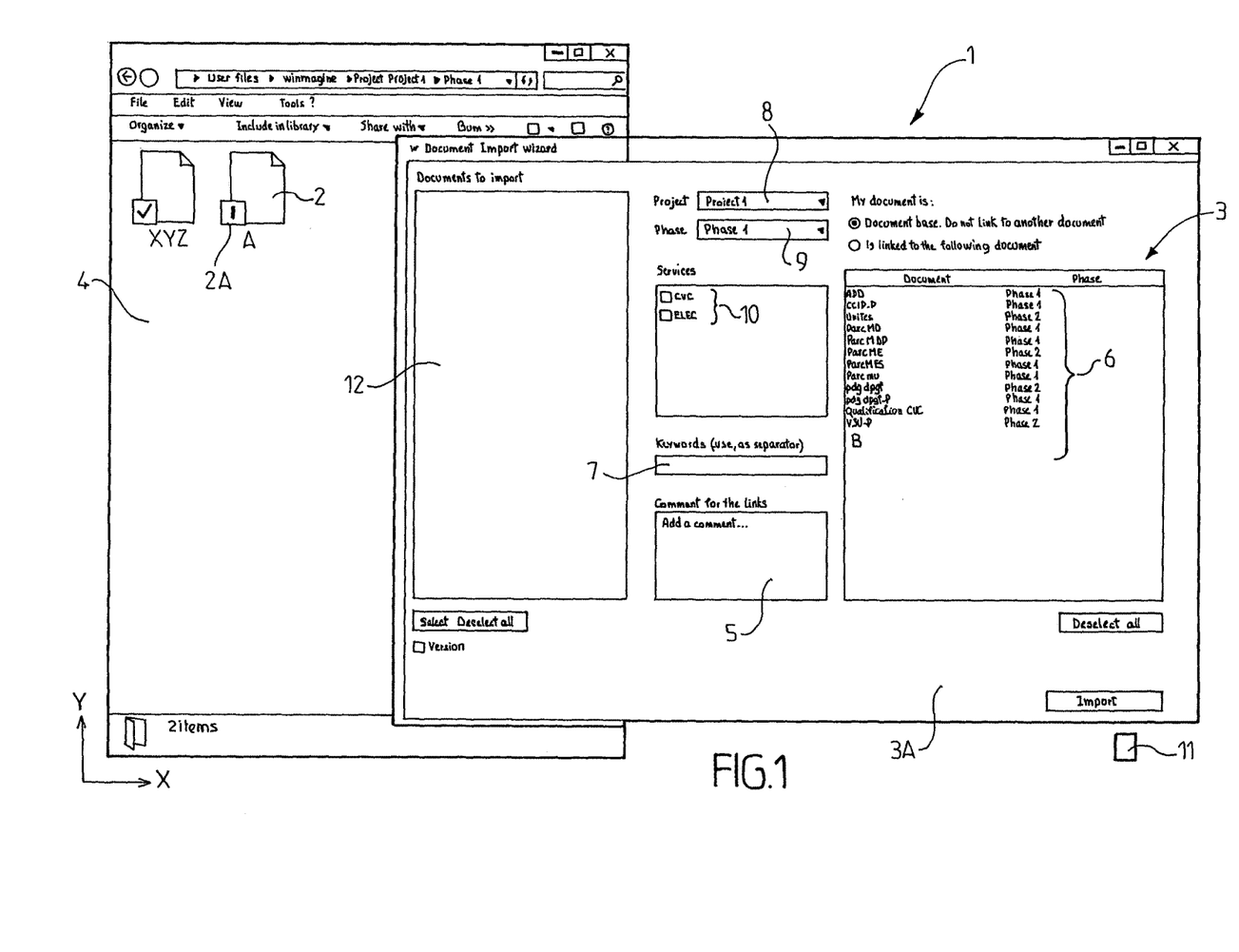
FIG. 1 schematically illustrates a content that can be seen on the display peripheral of the workstation of the installation of the invention; this content consists of a desktop environment including a background on which are displayed, on the one hand, an import window symbolizing an import directory, which in the present case contains two files, and on the other hand, a menu enabling in particular the workstation user to proceed to the recording, on the server of the installation, of the existence of a link between one of said files contained in the import directory and another file belonging to a list displayed by the menu in question.

In the case, illustrated in FIG. 1, where the first interactive tool 3 comprises a menu 3A, said menu 3A is advantageously provided with an area, corresponding to the first input area 5, in which the user can input a text, by means for example of the keyboard equipping his/her workstation, said text explaining the reasons that have lead the user to record a link between the first file A and the second file B. This text is then recorded on the server in such way to be subsequently accessible to the users who want to get access thereto, for example by clicking on the first icon 2. These explanations then enable everybody to fully understand the basis of the link between the first file A and the second file B.

Advantageously, the first interactive tool 3 comprises at least one list 6 of a group of files belonging to said set of files, said group including in the present case said second file B. The list 6 enumerates the names of the files the user is authorized to link to the first file A. For that purpose, the graphical user interface of the installation of the invention is advantageously adapted to enable a user of the workstation to select within said list 6 at least one file, in the present case at least said second file B, in order to record on the server the existence of said link between said first file A and second file B. The selection of the file(s) to be linked in the list 6 may for example be performed by means of the control peripheral. For example, when the control peripheral comprises a mouse, this selection may be performed by clicking successively on the file(s) present in the list 6 and which the user wants to link to the first file A. Preferably, the group of files of the list 6 is determined as a function of criteria linked for example to the user and/or to the first file A. For example, the list 6 may be established as a function of the access rights of the concerned user. The list 6 may also be established as a function of metadata attached to the first file A. The metadata may comprise, for example, in a non-limitative way: a project name, a project phase, keywords, etc. The list 6 will then be able to display, for example, the files that belong to the same project as the first file A and that are thus all allocated with the same project name as metadata. Advantageously, the first interactive tool 3 is adapted not only to enable the user to record the existence of a link between a first file A and at least one second file B, but also to enable the user to associate at least one metadata item with the first file A.

For that purpose, the first interactive tool 3 advantageously includes a second input area 7 enabling said user to input and record on said server keywords relating to said first file A. The second input area 7 may for example enable a free input, i.e. the user may input the keywords of his/her choice, for example by means of a keyboard associated with the workstation. It is also possible that the second input area 7 displays a predetermined list of keywords among which the user will be able to operate a selection by means of the control peripheral.

Advantageously, the first interactive tool 3 is adapted, on the one hand, to display at least one list 8, 9, 10 of metadata, and on the other hand, to enable the user of said workstation to select within said list 8, 9, 10 at least one metadata item, in order to record on said server the allocation of said metadata item to said first file A.

For example, in the embodiment illustrated in FIG. 1, the first interactive tool 3, formed in the present case by the menu 3A, is adapted to display three lists of metadata, in the form of two scrollable lists 8, 9 corresponding respectively to a list of project names and to a list of project phases on which the first file A is liable to depend. The first menu 3A also displays, in the form of a list 10 of check boxes, a list of services of the concerned company (for example, production, sales, marketing, accountancy services, etc.).

The selection of metadata in the lists 8, 9, 10 is performed conventionally by means of the control peripheral. Therefore, the first interactive tool 3 makes it possible to allocate various metadata to the first file A. Of course, the set of metadata allocated to the first file A (including the link with the second file B and preferably the above-mentioned unique identifier) does not affect the content of the first file A, which is never altered by the metadata in question. In a way, the installation thus simply makes it possible to "encapsulate" the file A with metadata, so that the file remains usable with a computer that does not belong to the installation. Such "encapsulation" is a notable and specific characteristic of the invention that besides constitutes as such an independent invention. Such encapsulation is advantageously consisted of two types of information associated as metadata to the file A, i.e.:

thematic information: input by a voluntary action of the user;

traceability information (history): generated automatically by the installation upon the operations performed on the file by the users.

Advantageously, said graphical user interface is adapted, on the one hand, to display in said virtual space 1 a launching pictogram 11 of said first interactive tool 3, and on the other hand, to enable said user to control, by interaction of the control peripheral with said launching pictogram 11, the display on the display peripheral of said first interactive tool 3. For example, the launching pictogram 11 is positioned in a horizontal toolbar arranged in the bottom of the screen advantageously forming the display peripheral. The interaction enabling the launching of the first interactive tool 3 advantageously consists in performing at least one mouse click on the launching pictogram 11, said mouse click causing the activation of the first interactive tool 3, which is materialized for example by the display of said first menu 3A. In this case, the first menu 3A advantageously comprises an import area 12 in which the user can deposit, for example by a drag-and-drop operation performed by means of the control peripheral (which advantageously comprises a mouse), one or several files the user wants to link to other files. Therefore, instead of depositing the file A in the import directory to access the functionality of recording the existence of a link between the first file A and the second file B, the user has the possibility, by clicking on the launching pictogram 11, to display the import area 12 in which he/she will be able to deposit the file A, which will enable him/her to access the same functionalities as if he/she had deposited the file A in the import directory.

Advantageously, said graphical user interface of the installation of the invention is adapted to display on the workstation display peripheral a graphical representation of the link between the first file A and the first file B, said graphical representation including at least a first and a second pictograms 13, 14 representing said first and second files A, B, respectively, as well as an elongated element 15, consisted for example by a straight-line segment (i.e. a stroke) extending between said first and second pictogram 13, 14 to graphically symbolize the existence of said link. Of course, the example exposed herein concerning two files A, B may be generalized to a greater number of files, as exposed in the figures. Finally, the graphical user interface is advantageously adapted to display on the display peripheral a graphical representation of all the links between each file of the set of files, or of a predetermined sub-group of files of said set, each file being represented by a pictogram whereas each links is represented by an elongated element extending between the pictograms of the linked files, said elongated element being advantageously consisted by a straight-line segment as exposed above.

Accordingly, in this preferential variant of the invention, the graphical user interface of the installation is composed of two parts, i.e.:
 a recording interface, enabling the workstation user (generally each user of each workstation of the installation) to record the existence of a link between the first file A and the second file B, and also to advantageously carry out other operations (duplication and recording files on the server, recording metadata, etc.), as exposed hereinabove; the recording interface is advantageously integrated, as a directory, to the file management system of the operating system installed on said workstation, as exposed hereinabove.
 an operating interface, which enables in particular the user to access a visual representation of the files recorded on the server, as well as the links liable to exist between said files.

The operating interface thus enables the user to rapidly and easily identify relevant groups of files, the relevance of these groups being guaranteed by the fact that they result from links recorded by a user, i.e. by a human person, and not by a machine. Preferably, the operating interface is implemented through a Web browser. Therefore, to get access to the operating interface and thus to the above-mentioned graphical representation, the user must advantageously launch the Internet browser installed on his/her workstation to access, after identification (for example by means of an identifier and a password), a remote site that corresponds to the operating interface.

Preferably, said installation comprises a means for identifying said user in order to control his/her access to said graphical representation.

Advantageously, to further improve the installation ergonomics, said graphical user interface is adapted to enable said user to control, by interaction of the control peripheral with at least said first pictogram 13 representing the first file A in the graphical representation, the display on said display peripheral of a second interactive tool 16 enabling said user to record on the server the existence of said link.

Accordingly, from the operating interface, and more precisely from the graphical representation generated by the operating interface, the user is capable of recording the existence of a link between two of the files whose pictograms 13, 14 are graphically represented.

Therefore, the second interactive tool 16 has advantageously substantially the same functionalities as the first interactive tool 3. Furthermore, it is conceivable that the computer installation implements only a single and same interface for both the recording and the operating, in which case the first interactive tool 3 and the second interactive tool 16 are merged together, i.e. they are formed by a single and same unique interactive tool. In this case, the first pictogram 13 and the first icon 2 are merged together, as well as the second pictogram 14 and the second icon 14.

Advantageously, the second interactive tool 16 comprises a graphical link means that operates as follows:
 the user controls, by interaction of the control peripheral (comprising for example a mouse) with the pictogram of the concerned file (for example the first pictogram 13), the launching of the graphical link means, which is materialized by the appearance of a segment whose first end is fixedly connected to the concerned file, whereas its other end is free and follows the movement of the cursor 17 of the mouse forming the control peripheral. The user thus just needs to approach the cursor of his/her mouse from the second file B to therefore position the second end of the stroke symbolizing the link at the second pictogram 14 representing the second file B. The graphical user interface will then detect the presence of the second end of the link segment near the second pictogram 14 and will generates in return the recording of a link between the first file A and the second file B.

Of course, this graphical link mode is not the single conceivable possibility. It is also possible, by way of an alternative and preferably as a complement, that the second interactive tool 16 comprises a second menu 16A, which is displayed for example in reaction to the passage of the cursor of the mouse forming the control peripheral on the first pictogram 13, said second menu 16A including a button 17 for access, by a simple click on the button 17 in question, to the interface for generating the recording of the link between the first file A and another file.

Preferably, the installation thus makes it possible, from the operating interface, to control in various ways the recording of a link between two files.

The graphical user interface of the installation of the invention is thus advantageously adapted to display, on the display peripheral, on the one hand, a cloud of pictograms 13, 14 (cf. FIGS. 2, 3 and 8) each representing a file A, B belonging to said set of files, and on the other hand, elongated elements 15 linking between each other some of said pictograms in order to symbolize the existence of a link between the corresponding files.

In order to facilitate the navigation within this cloud, the graphical user interface is advantageously provided with a system for performing drill-down and drill-up operations in order to obtain either a precise view of a portion of the cloud of pictograms, or a more general view of the pictograms, respectively. In order to facilitate the navigation, the graphical user interface also advantageously includes a miniature navigation window in which can be seen the whole cloud of pictograms, as well as a rectangle 19 representing the user's frame of vision.

Figure 4:
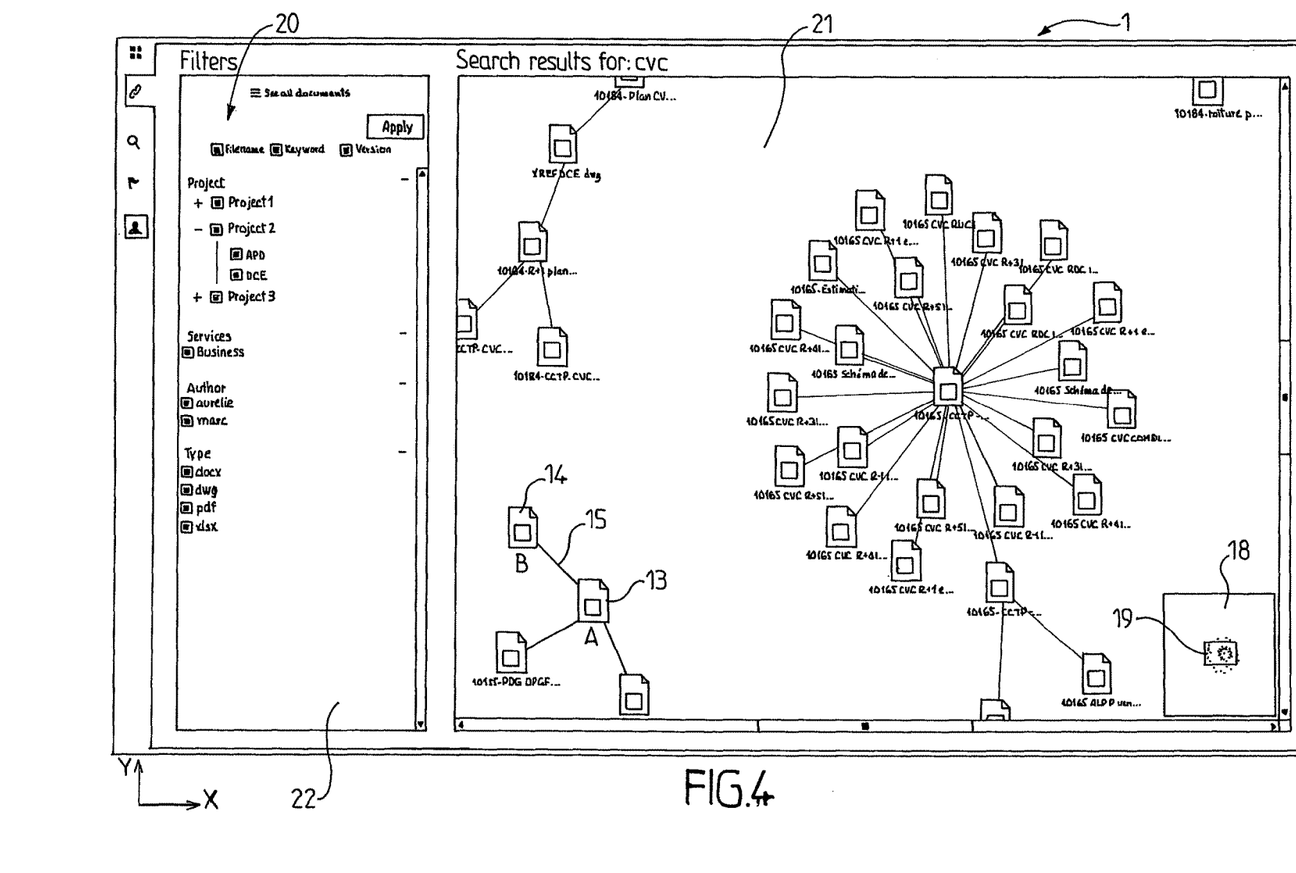
FIG. 4 illustrates a sorting tool with which the graphical user interface of the installation of the invention is advantageously provided, the sorting tool enabling the user to select one or several criteria so that the cloud of pictograms displayed on the display peripheral is formed only of pictograms representing files fulfilling the selected criterion or criteria.

Advantageously, the graphical user interface also includes at least one sorting tool 20, preferably integrated to the operating interface, and enabling the user to select one or several criteria, so that said cloud of pictograms is formed only by pictograms representing files fulfilling the selected criterion or criteria. The sorting tool 20 thus makes it possible to filter the pictograms to be displayed as a function of predetermined criteria that can be selected by the user.

Preferably, the operating interface is in the form of a main display area 21 in which the cloud of pictograms is displayed and a sidebar 22, adjacent to the main display area, in which various tools, as for example the sorting tool 20 in question, will be displayed. This sorting tool enables, for example, to filter the display of pictograms in the display window 21 as a function of different metadata attached to the files of the set of files. Therefore, it is for example possible to display only the files attached to a same project, and/or only the files attached to a same service, and/or only the files of a same format and/or only the files associated with a same keyword, etc. The sorting tool 20 thus enables the user to use at best the data that might have been previously input, during the recording of the concerned files on the server, by the users themselves. The installation of the invention offers in this case powerful functions of identification of relevant files.

Figure 2:
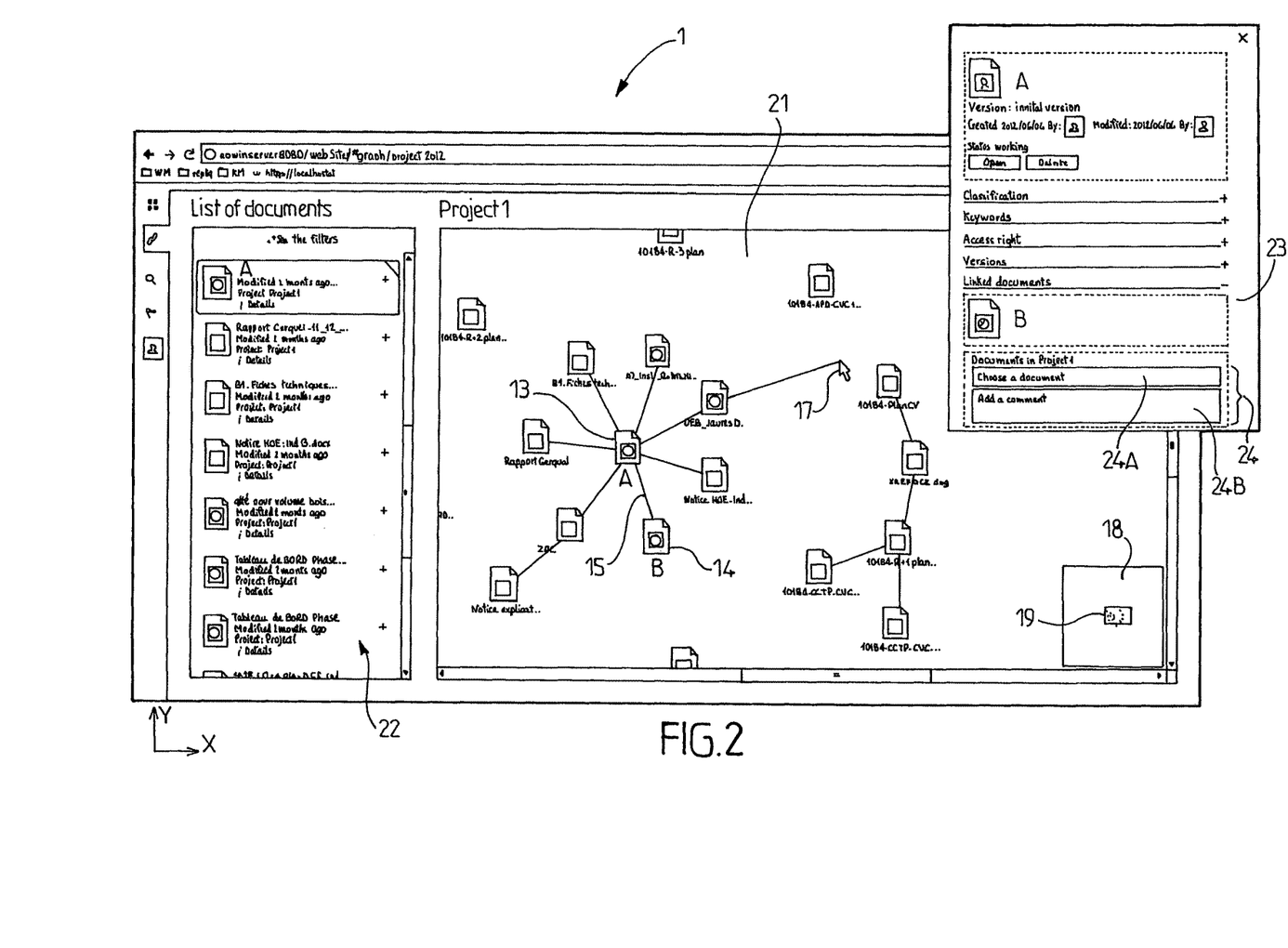
FIG. 2 illustrates another content that can be seen on the display peripheral of the workstation of the computer installation of the invention, this content comprising, on the one hand, a cloud of pictograms each representing a file belonging to said set of files, and on the other hand, strokes linking between each other some of said pictograms to symbolize the existence of a link between the corresponding files; this content also includes a sidebar in which is displayed a list of the files represented by the cloud of pictograms; this content finally includes a menu enabling the workstation user to record on the server the existence of a link between a file selected in the abovementioned list and another file of the set of files.
Figure 3:
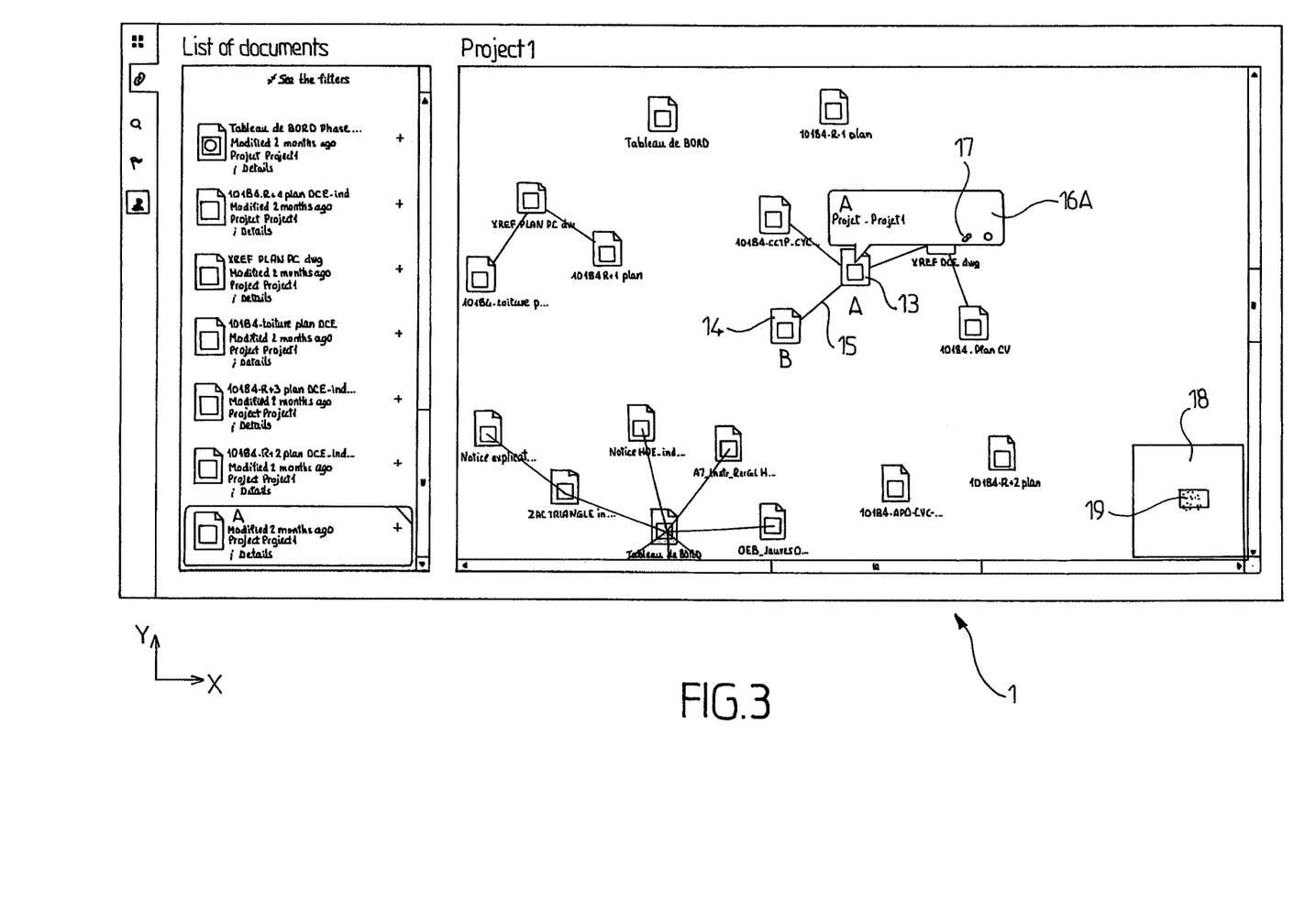
FIG. 3 illustrates a content displayed on the workstation display peripheral that is similar to that of FIG. 2 but that differs therefrom in particular in that it includes a window giving indications about a file selected by the user by means of the control peripheral equipping the workstation, said window also including commands enabling in particular the user to record the existence of a link between the concerned file and another file.

Advantageously, the graphical user interface is adapted to enable a user to display, if he/she wants to, a list of all the documents of the cloud of pictograms that can be seen in the window 21. This list, illustrated in FIG. 2, is itself advantageously interactive, in order to enable the user, by selecting in the list (for example by means of the control peripheral) a specific file, to launch the opening of the third menu 23 preferably consisting in an expandable tab box enabling a user to access all or part of the metadata possibly attached to the concerned files.

Preferably, the first menu 23 also contains the list of files linked to the selected files. In the example of FIG. 2, the user has hence selected the first file A in the list of the sidebar 22, which has generated the opening of the third menu 23 enabling the user to know that the first file A is linked to the second file B, which of course confirms the graphical representation that can be seen in the window 21. The third menu 23 is also provided with an interface 24 enabling the user to record the existence of a link between the first file A and still one another or other file(s). For that purpose, it advantageously comprises a link interface 24 comprising for example an interactive area 24A enabling the user to access a list of files and/or to input a file name, and an input area 24B enabling the user to input a comment in order to explain why he/she has decided to record the link in question.

Generally, the graphical user interface is adapted to enable a user of the workstation to control, by interaction of the control peripheral with the first icon 2 and/or with the first pictogram 13, the display on said display peripheral of an information window (which may be, for example, included in the third menu 23, as exposed hereinabove) adapted to inform said user of the possible existence of a link between the first file A and other files, and for example of the possible existence of a link between the first file A and the second file B.

Figure 5:
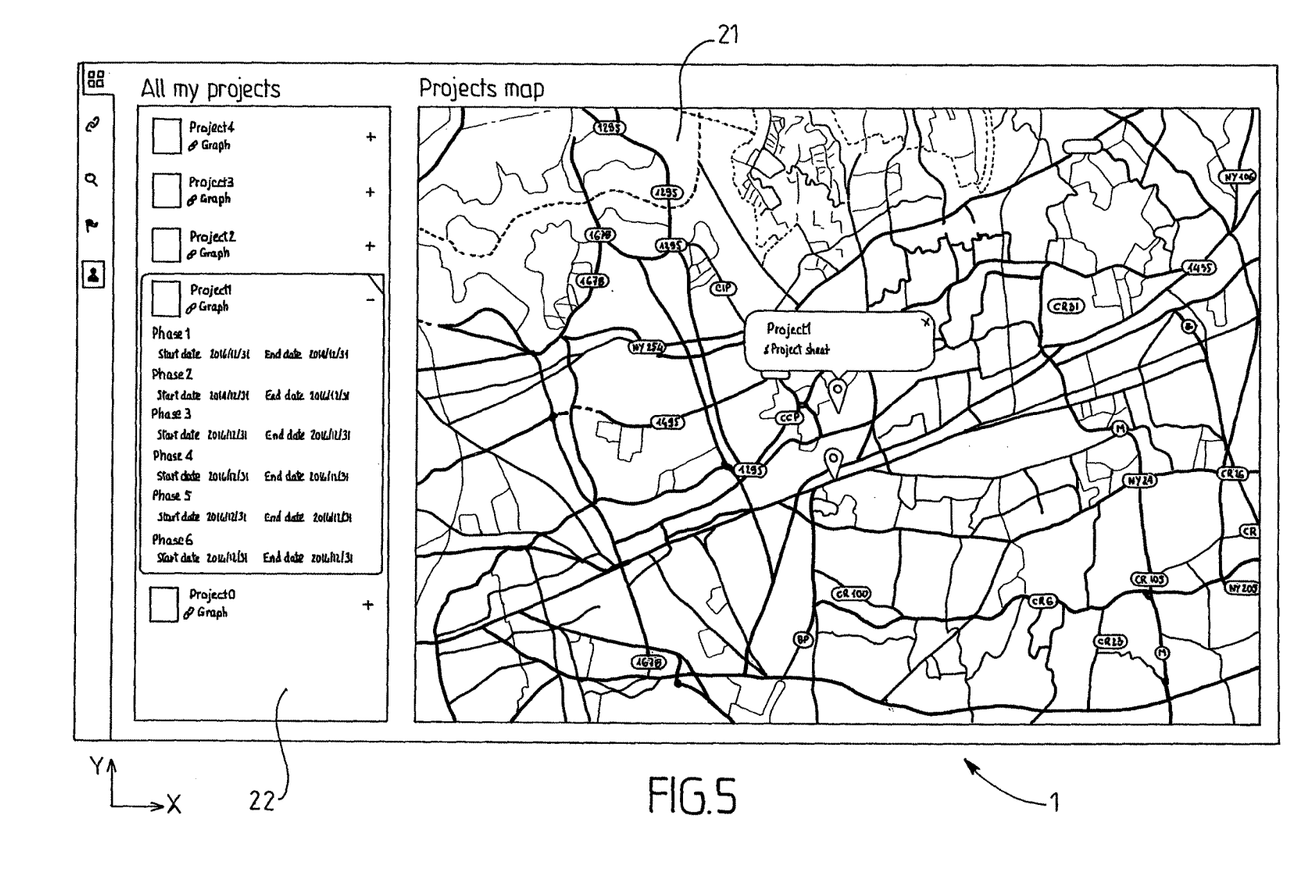
FIG. 5 is a view of a content that may be displayed by the control peripheral of the workstation of the installation of the invention, this content consisting, on the one hand, of a list of projects, and on the other hand, a geographic card making it possible to localize the projects in question.

Advantageously, the operating interface also makes it possible to display, in its main display window 21, graphical elements other than the cloud of pictograms. Therefore, as illustrated in FIG. 5, it is conceivable to display in the main display window 21 a geographic card where the various current projects are positioned, each project being associated with groups of files.

Of course, as exposed hereinabove, the name of each project constitutes a metadata item that is advantageously attached, according to the above-mentioned methods, to each file of the concerned project. The installation of the invention also makes it possible to display a card with the geographic location of all or part of the company projects, said projects being listed in the sidebar 22, as illustrated in FIG. 5. The user can then, by selecting a specific project in the above-mentioned list, get access for example to the project in question, with a view of the links between the files in question.

The installation of the invention thus offers an extremely easy and intuitive management of project documents, while facilitating and safeguarding the collaborative work on the concerned files.

The invention also relates to a method for managing a set of files, each of said files being recorded on a server and/or on a workstation provided with a display peripheral and a control peripheral, said servers and workstations being part of a network.

The management method of the invention advantageously corresponds to the process implemented by the above-described installation. Accordingly, the above description relating to the installation also applies to the file management method of the invention.

This method comprises at least the following steps:
- a graphic user interface displays, on said display peripheral, at least one virtual space 1 as well as a first icon 2 that represents one of said files of the set of files, called the first file A, said first icon 2 being placed within said virtual space 1,
- a user of said workstation controls, by interaction of the control peripheral with said first icon 2 and without said first file A being open, the display on said display peripheral of a first interactive tool 3, a tool that the user can advantageously control by means of the control peripheral, as explained hereinabove relating to the installation,
- said user records on said server, by means of said first interactive tool 3, the existence of a link between the first file A and at least another file B of the set of files, called the second file, said recording of the existence of said link being adapted to last independently of the subsequent location of said first icon 2 within said virtual space 1.

One of the main interests of the method of the invention, which is advantageously implemented by means of the installation of the invention, lies in the possibility for the user to extremely easily and rapidly establish, in a familiar environment, a permanent link between at least two files, independently of the instantaneous or future location of the concerned files in the memory of the workstation and/or of the server.

The invention moreover relates to a computer program comprising a computer program code means adapted to execute the steps of a method according to what precedes, when said program is executed by a computer.

The invention further relates to a computer program according to what precedes, implemented on a computer-readable medium, as well as a computer-readable medium on which is recorded the program in question.

INDUSTRIAL APPLICABILITY

The invention finds its industrial application in the design, the manufacturing and the use of a file management computer installation including a graphical user interface.

The invention claimed is:

1. A computer installation for the management of a set of files, comprising:
  a network including at least a server and a workstation, said network configured for establishing a computer-based communication between said server and said workstation, said workstation including a display peripheral and a control peripheral, each of said set of files being recorded on at least one of said server or on said workstation and wherein a first plurality of files of said set of files is recorded on said server and a second plurality of files of said set of files is recorded on said workstation, said installation further comprising a graphical user interface that is adapted to:
  display, on said workstation display peripheral, at least one virtual space (1) as well as a first icon (2) that represents one file (A) of the set of files, called the first file, said first icon (2) being displayed on and placed within said virtual space (1) of said workstation display peripheral; and enable a user of said workstation to control, by interaction of the control peripheral with said first icon (2) and without said first file (A) being open and without said user having to access a content of said first file (A), display on said display peripheral of a first interactive tool (3) configured for enabling said user to record on said server the existence of a link between said first file (A) and at least another one of said files of the set of files, called the second file (B), and wherein existence of said link between said first file (A) and at least one other of said files such set of files called the second file (B) exists independently of a way and a location in which and where the corresponding first and second flies (A,B) are classified and stored, and wherein said recording of the existence of said link on said server being adapted to last independently of the subsequent location of said first icon (2) within said virtual space (1) and independently of the recorded location of said first file (A) and said second file (B); and wherein said workstation includes an operating system implementing a directory tree hierarchy, said computer installation including an import directory that is part of said directory tree hierarchy, said graphical user interface being adapted to enable said user to control said display of said first interactive tool (3) by moving said first file (A) to said import directory.

2. The computer installation according to claim 1, wherein said graphical user interface is adapted to enable a user of said workstation to control, by interaction of the control peripheral with said first icon (2), the display on said display peripheral of an information window adapted to inform said user of the possible existence of said link.

3. The computer installation according to claim 1, wherein said first interactive tool (3) includes a first input area (5) enabling said user to input and record on said server information relating to the nature of said link.

4. The computer installation according to claim 1, wherein said graphical user interface is adapted, one the one hand, to display, on said display peripheral, an import window (4) representing said import directory, and on the other hand, to enable said user to control said display of said first interactive tool (3) by moving said first icon (2) to said import window (4) by means of said control peripheral.

5. The computer installation according to claim 1, wherein said installation is adapted to duplicate the files contained in said import directory on the server, and to perform a synchronization of said files.

6. The computer installation according to claim 1, wherein said graphical user interface is adapted to modify the visual aspect of said first icon (2) when said first file (A) is moved for the first time in the import directory.

7. The computer installation according to claim 1, wherein said first interactive tool (3) comprises at least one list (6) of a group of files belonging to said set of files, said group including said second file (B), said graphical user interface being adapted to enable a user to select within said list (6) at least said second file (B), in order to record on said server the existence of said link between said first file (A) and second file (B).

8. The computer installation according to claim 1, wherein said first interactive tool (3) includes a second input area enabling said user to input and record, on said server, keywords relating to said first file.

9. The computer installation according to claim 1, wherein said first interactive tool (3) is adapted to display at least one list of metadata (8, 9, 0), and to enable the user to select within said list (8, 9, 0) at least one metadata item, in order to record on said server the allocation of said metadata item to said first file (A).

10. The computer installation according to claim 1, wherein said graphical user interface is adapted to display in said virtual space (1) a launching pictogram (11) of said first interactive tool (3), and to enable said user to control, by interaction of the control peripheral with said pictogram (11), the display on said display peripheral of said first interactive tool (3).

11. The computer installation according to claim 1, wherein said graphical user interface is adapted to display on said display peripheral a graphical representation of said link, said graphical representation including at least a first and a second pictograms (13, 14) representing said first and second files (A, B), respectively, as well as an elongated element (15) extending between said first and second pictograms (13, 4) to graphically symbolize the existence of said link.

12. The computer installation according to claim 11, wherein said graphical user interface is adapted to enable said user to control, by interaction of the control peripheral with at least said first pictogram, the display on said display peripheral of a second interactive tool (16) enabling said user to record on said server the existence of said link.

13. The computer installation according to claim 11, said installation comprising a means for identifying said user in order to control the access of the latter to said graphical representation.

14. The computer installation according to claim 1, characterized in that said graphical user interface is adapted to display on said display peripheral a cloud of pictograms each representing a file belonging to said set of files, and elongated elements linking between each other some of said pictograms to symbolize the existence of a link between the corresponding files, said graphical user interface including at least one sorting tool (20) enabling the user to select one or several criteria, so that said cloud is only formed of pictograms representing files fulfilling the selected criterion or criteria.

15. A method for managing set of files, each of said files being recorded on at least one of a server or on a workstation provided with a display peripheral and a control peripheral, and wherein a first plurality of files of said set of files is recorded on said server and a second plurality of said set of files is recorded on said workstation, said servers and workstations being part of a network, said network, said network configured for establishing a computer-based communication between said server and said workstation, said workstation, said method comprising at least the following steps:

causing a graphic user-interface to display, on said display peripheral, at least one virtual space (1) as well as a first icon (2) that represents one (A) of said file of the set of files, called the first file, said first icon being placed within said virtual space (1), controlling by a user of said workstation, by interaction of the control peripheral with said first icon (2) and without said first file (A) being open and without said user having to access a content of said first file (A), the display on said display peripheral of a first interactive tool (3), and recording by said user on said server, by means of said first interactive tool (3), the existence of a link between said first file (A) and at least another one of said files (B) of the set of files, called the second file, and wherein existence of said link between said first file (A) and at least one other of said files of such set files called the second file (B) exists independently of a way and a location in which and where the corresponding first and second files (A,B) are classified and stored, wherein said recording of the existence of said link on said server is adapted to last independently of the subsequent location of said first icon (2) within said virtual space (1).

16. A computer program stored on a non-transitory computer readable medium comprising a computer program code adapted to execute the steps of a method according to claim 15, when said program is executed by a computer.

17. The computer program according to claim 16, implemented on a computer-readable medium.

18. A computer-readable medium on which is recorded a program according to claim 16.

* * * * *